United States Patent [19]
Ueda et al.

[11] Patent Number: 5,346,035
[45] Date of Patent: Sep. 13, 1994

[54] FORK LIFT TRUCK WITH ROTATABLE SEAT AND OPERATOR CONTROLS

[75] Inventors: Ichiro Ueda; Takashi Suzuki, both of Yokohama; Akihiko Sakai, Matsudo, all of Japan

[73] Assignee: Nippon Yusen Kaisha, Tokyo, Japan

[21] Appl. No.: 142

[22] Filed: Jan. 4, 1993

[51] Int. Cl.$^5$ .................. B60K 26/00; B62D 1/02
[52] U.S. Cl. .................... 180/329; 180/331; 180/336; 180/326
[58] Field of Search ........... 180/329, 330, 331, 326, 180/336; 172/435; 297/349

[56] References Cited

U.S. PATENT DOCUMENTS

| | | | |
|---|---|---|---|
| 3,063,173 | 11/1962 | Wardle | 180/331 X |
| 3,195,913 | 7/1965 | Hallsworth | 180/329 X |
| 3,347,558 | 10/1967 | Grimes et al. | 180/329 X |
| 3,357,513 | 12/1967 | Sundberg | 180/329 |
| 3,933,224 | 1/1976 | Nilsson et al. | 180/331 X |
| 4,066,143 | 1/1978 | Umeda et al. | 180/329 |
| 5,052,512 | 10/1991 | Pakosh et al. | 180/329 |

FOREIGN PATENT DOCUMENTS 1206030 9/1970 United Kingdom ............... 180/329

Primary Examiner—Margaret A. Focarino
Assistant Examiner—Peter English
Attorney, Agent, or Firm—Longacre & White

[57] ABSTRACT

A self-propelled fork lift truck comprises a working mechanism at the front end of the fork left truck, a revolving driver's stand, a driver's seat and a steering wheel mounted on the revolving driver's stand, a speed change gear having a plurality of speed shifting ratios for running in a forward direction and a plurality of speed shifting ratios for running in a backward direction, and a speed change gear controlling device. When the revolving driver's stand is turned facing the front end of the fork lift truck, the controlling device restricts the operation of the speed change gear to a first of the plurality of speed shifting ratios for running in the backward direction. When the revolving driver's stand is turned facing the rear end of the fork lift truck, the controlling device restricts the operation of the speed change gear to a first of the plurality of speed shifting ratios for running in the forward direction.

3 Claims, 5 Drawing Sheets

FORK LIFT TRUCK WITH ROTATABLE SEAT AND OPERATOR CONTROLS

BACKGROUND OF THE INVENTION

1. Field of the Invention

The present invention relates to a fork lift truck used in working sites such as in warehouses or cargo distribution terminals for loading and unloading cargoes or similar other articles or transportation of them. More in particular, it relates to a fork lift truck capable of turning a driver's stand to the running direction of a self-propelled vehicle.

2. Description of the Prior Art

In working sites such as warehouses or cargo distribution terminals, cargoes are usually loaded, unloaded or transported by using fork lift trucks.

A fork lift truck has a working mechanism such as a fork and a lifting mechanism therefor which are equipped at the front end of a self-propelled vehicle.

In the fork lift truck of the aforementioned type, since cargoes to be handled are present ahead of a truck driver, the front view of the driver is limited remarkably. Therefore, if the fork lift truck should happen to approach a dangerous obstacle, it is difficult for the driver to instantly recognize and avoid the same, which often leads to an accident.

By the way, referring to the statistic of mortal accidents caused, for example, by cargo transportation machines in 1989, most of them were attributable to fork lifts and they exceed more than 80% of total accidents throughout the entire field of industries. Further, as a result of a survey for the causes of the mortal accidents caused by the fork lift trucks, it has been found that about 70% of the entire accidents is responsible to the restricting of the driver's view. Accordingly, it is extremely important to prevent accidents caused by the fork lift trucks.

Further, in the cargo handling operation, a fork lift truck usually fetches cargoes from an aimed operation spot along an identical running path. Then, after loading the cargoes, a driver has to run the lift truck while tracing a backwarding loop for turning the running direction. However, such rotating and backward operation is less efficient in the maneuverability and more liable to cause traffic danger as compared with the running operation in the forward direction.

In addition, since the looping operation is out of the intended linear cargo fetching path, this operation is needless and wasteful, and worsens the efficiency of the cargo transportation.

Further, a driver is obliged to take an unnatural and twisted position for ensuring a clear view during the backward and rotating operation, as well as when cargoes are mounted in the front part of the fork lift. This reduces the operation efficiency, as well as makes the driver liable to be fatigued or suffer from lumbago or like other disease. Accordingly, it makes prolonged operation difficult and necessitates relief persons depending on the case.

OBJECT OF THE INVENTION

The present invention has been achieved in view of the foregoing situations and it is an object thereof to provide a fork lift truck capable of remarkably decreasing the danger of accidents caused by the fork lift truck, capable of remarkably improving the operation efficiency, as well as capable of preventing a driver's lumbago or like other disease caused by continuous and repeating operations in unnatural and constrained posture.

Another object of the present invention is to provide a fork lift truck capable of turning the direction of a driver's seat, capable of obtaining a good running performance, when a driver's seat is turned backward, in the same manner as in the case when the driver's seat is directed forward, and capable of being free from danger during backward running.

A further object of the present invention is to provide a fork lift truck capable of controlling the operation of vehicle lamps, when a driver's seat is turned backward, in the same manner as in a case when the driver's seat is directed forward.

A still further object of the present invention is to provide a fork lift truck capable of simplifying the structure of a rotational mechanism for a driver's stand.

SUMMARY OF THE INVENTION

The foregoing object of the present invention can be attained in accordance with the present invention by a fork lift truck comprising:

a self-propelled vehicle having a working mechanism disposed at a front end thereof;

a driver's stand disposed on the self-propelled vehicle;

a driver's seat and a controlling device mounted respectively to the driver's stand;

a mechanism for revolving the driver's stand around a vertical axis between a position at which the driver's seat is directed forward and another position at which the driver's seat is directed backward.

For instance, in the existent fork lift truck, after running a self-propelled vehicle forward and loading cargoes on the self-propelled vehicle, a driver has to run the vehicle backward while tracing a loop for turning the running direction in an unnatural and constrained posture. In the present invention, however, such troublesome operation can be saved and substituted by a simple forward running operation. Particularly, after the direction of the driver's stand has been turned, since the driver's forward view is not obstructed by the cargoes or the working mechanism, the driver is no longer obliged to take an unnatural and constrained posture for ensuring his view. Accordingly, possibility of collision or like other accident can be reduced, the driver can be free from lumbago or like other disease and, in addition, the operation efficiency can be enhanced remarkably.

BRIEF DESCRIPTION OF THE DRAWINGS

These and other objects, as well as advantages of the present invention will be readily appreciated referring to the following descriptions and appended drawings, in which.

DETAILED DESCRIPTION OF THE PREFERRED EMBODIMENET

Description will be made to a preferred embodiment shown in FIGS. 1 to 8.

Figure 1:
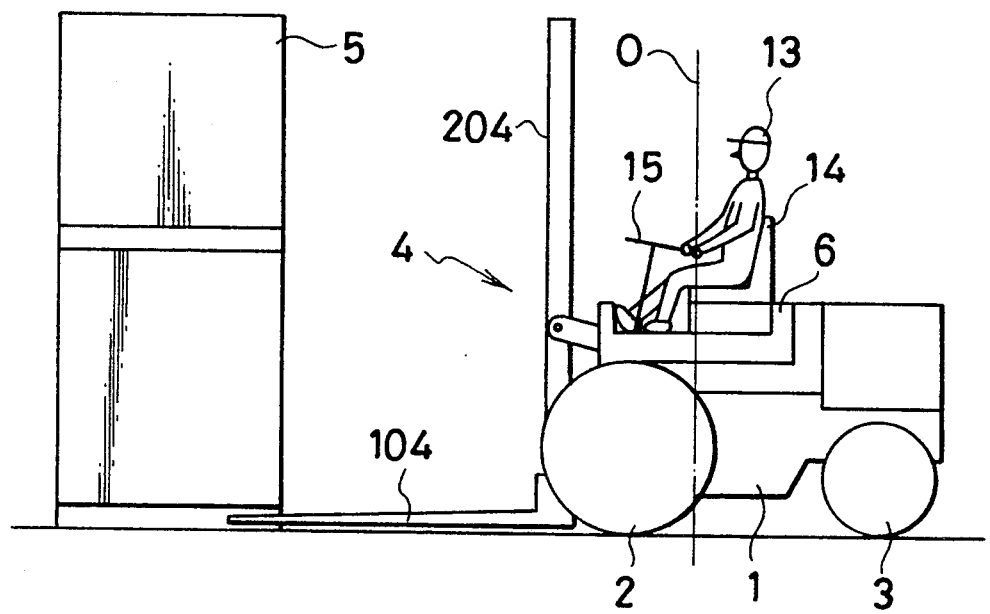
FIG. 1 is a schematic view of a fork lift truck as a preferred embodiment according to the present invention, in which a driver's stand is in a state directed forward.
Figure 2:
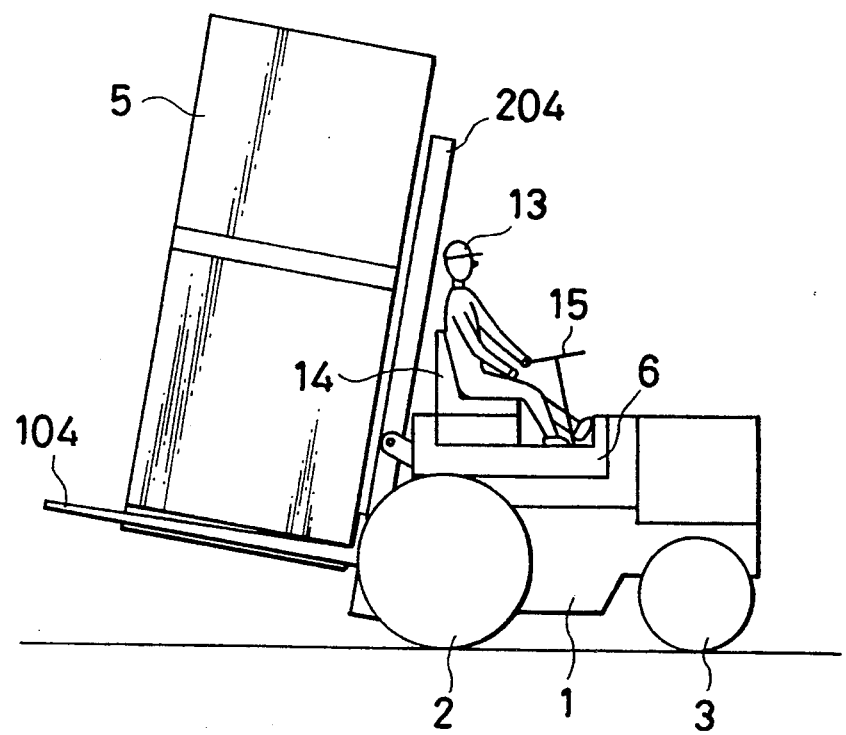
FIG. 2 is a schematic view of the fork lift truck, in which the driver's stand is turned backward from the state shown in FIG. 1.

FIGS. 1 and 2 schematically illustrate a preferred embodiment of a fork lift truck according to the present invention, in which a self-propelled vehicle has a driving wheel 2 and a steering wheel 3. The self-propelled vehicle 1 has a working mechanism 4 disposed at the front end. The operation mechanism 4 comprises a fork 104 for manipulating cargoes 5 and a lifting mechanism 204 therefor. A driver's stand 6 is disposed above the self-propelled vehicle 1.

Figure 3:
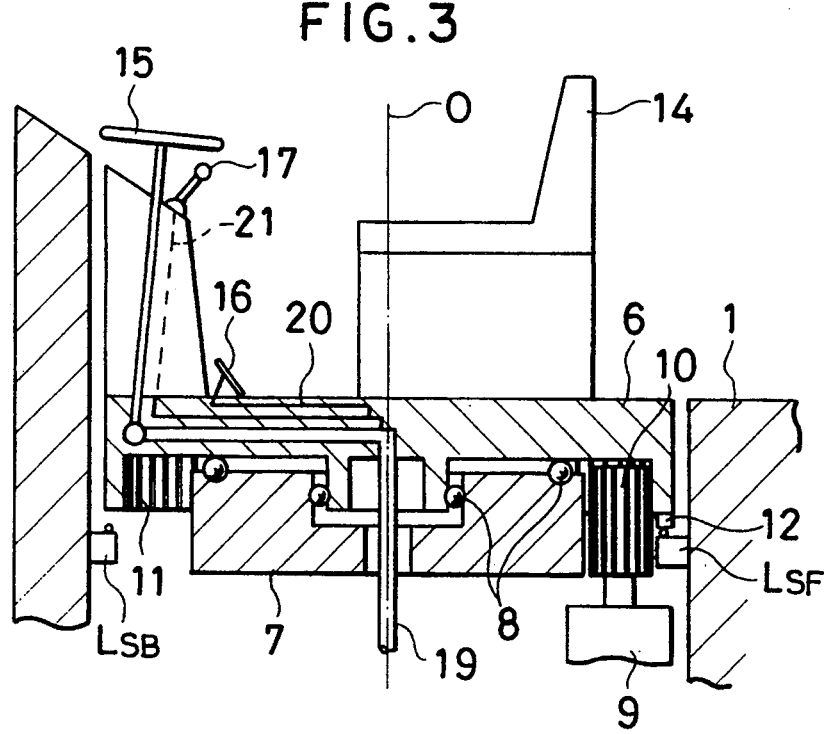
FIG. 3 is a cross sectional view of the driver's stand shown in FIG. 1.
Figure 4:
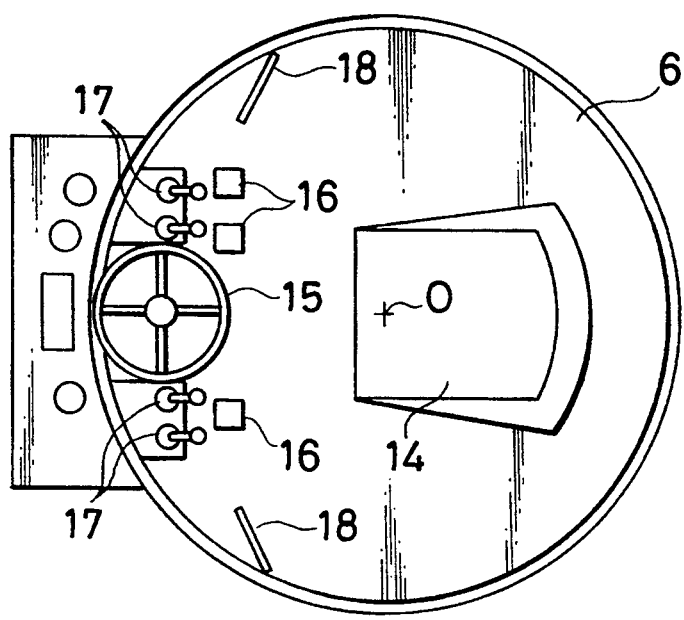
FIG. 4 is a plan view of FIG. 3.

As shown in FIGS. 3 and 4, the driver's stand 6 is mounted by way of bearings 8 on a disk-shaped rack 7 secured to the self-propelled vehicle 1 such that the stand can turn by 180° in each of the clockwise and counter clockwise directions (FIG. 4) around a vertical axis O. An internal gear 11 is formed integrally to the inner circumferential surface at the lower side of the driver's stand 6 for engagement with a driving gear 10 which is driven by a motor 9 for the driver's stand 6. The rotating direction of the stand motor 9 is controlled by relays $M_F$ and $M_B$ detailed later in conjunction with FIG. 8 for controlling the rotation of the driver's stand 6.

As shown in FIG. 3, an actuation member 12 is secured at a circumferential position on the lower side of the driver's stand 6. A forward limit switch $L_{SF}$ and a backward limit switch $L_{SB}$ are disposed, respectively, on the side of the self-propelled vehicle 1. When the driver's stand 6 in the forwarded state shown in FIG. 1 (FIG. 3) turns by 180° into the backwarded state shown in FIG. 2, the backward limit switch $L_{SB}$ is brought into contact with the actuation member 12 and turns open. On the other hand, when the driver's stand 6 in the backwarded state shown in FIG. 2 turns by 180° into the forwarded state shown in FIG. 1 (FIG. 3), the forward limit switch $L_{SF}$ is brought into contact with the actuation member 12 and turns open.

As shown in FIG. 1 to FIG. 4, the driver's stand 6 is equipped, on the upper side thereof, with a driver's seat 14 on which a driver 13 sits, a steering device 15 for steering the steering wheel 3, pedals 16 for controlling the self-propelled vehicle 1, levers 17 for controlling the self-propelled vehicle 1 and the working mechanism 4, and a back mirror 18 respectively. As shown in FIG. 3, an operation transmission system 19 for the steering device 15, an operation transmission system 20 for the pedals 16 and an operation transmission system 21 for the levers 17 are passed through the driver's stand 6 at a position near the vertical axis 0 and led out to the side of the self-propelled vehicle 1. Thus, each of the operation transmission systems 19, 20 and 21 suffers from no troubles when the driver's stand 6 revolves clockwise or counter-clockwise.

Figure 5:
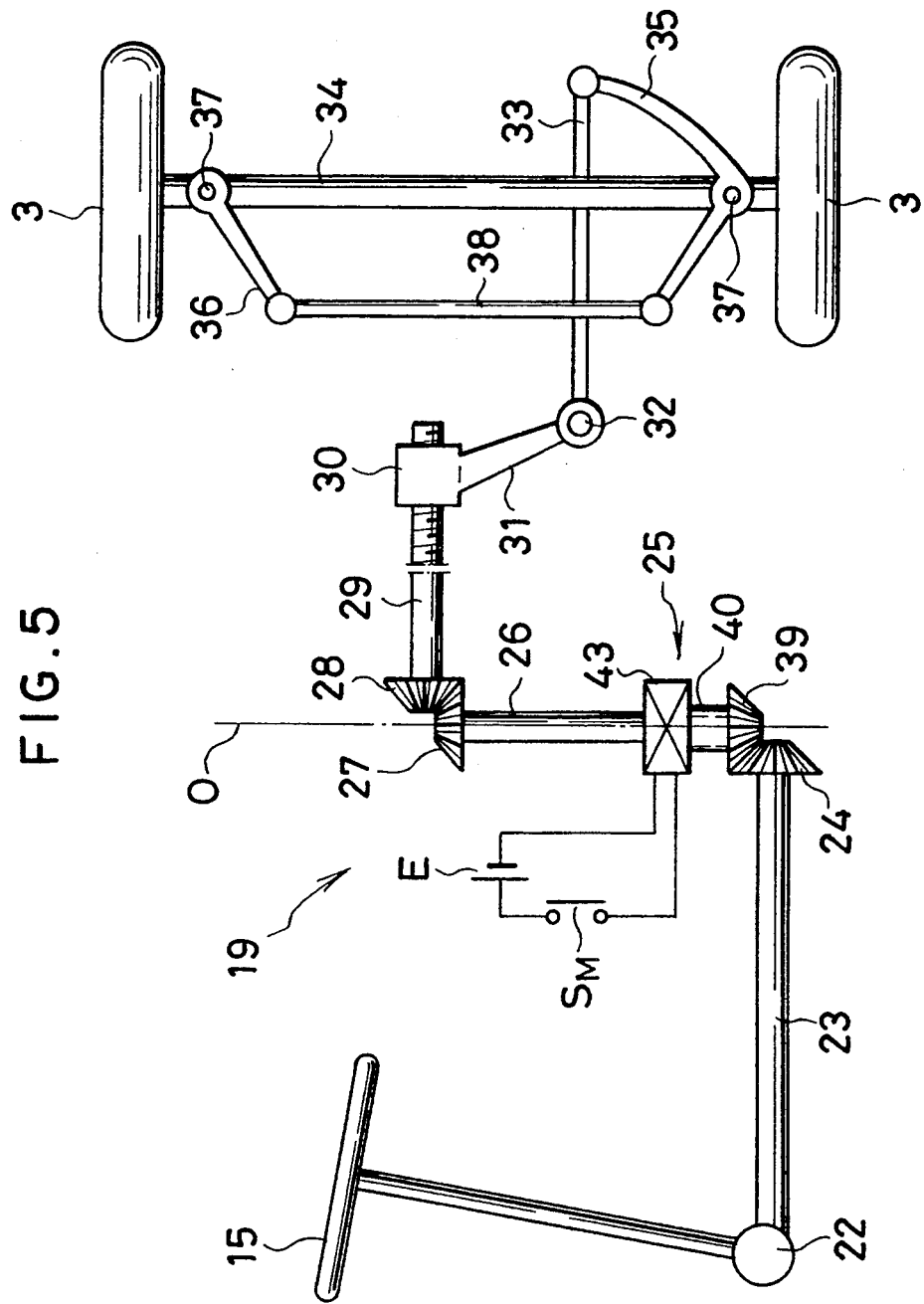
FIG. 5 is a schematic view illustrating an operation transmission system in a steering device.

FIG. 5 shows the operation transmission system 19 for the steering device 15, in which a steering operation from the steering device 15 is transmitted by way of a universal joint 22 to a steering wheel shaft 23. The movement of the steering wheel shaft 23 is transmitted by way of a bevel gear 24 formed at the top end thereof to a coupling device 25 and, further, by way of an intermediate shaft 26 and a pair of bevel gears 27, 28 to a steering shaft 29.

A steering gear box 30 is screw-coupled with a male screw of the steering shaft 29. A pit man arm 31, which is extended from the steering gear box 30, is connected by way of a ball joint 32 to one end of a coupling arm 33.

Also as shown in FIG. 5, a track arm 35 and a knuckle arm 36 are pivoted by way of respective pivots 37 to both ends of an axle 34 and the arms 35 and 36 are interlocked by way of a tie rod 38. The other end of the coupling arm 33 is pivoted to the track arm 35.

Figure 6:
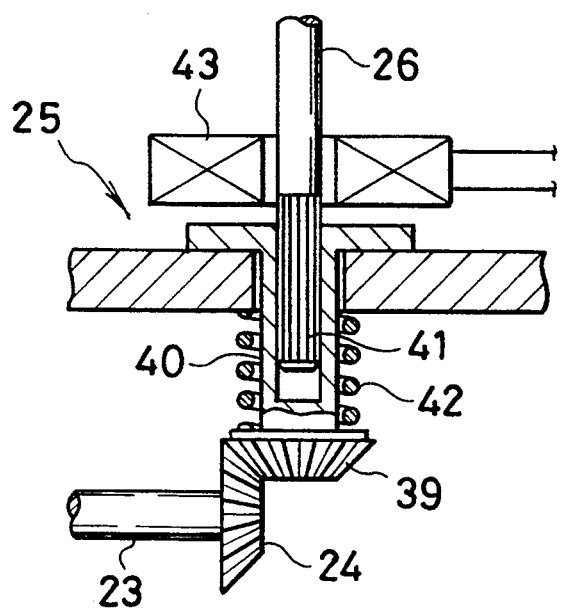
FIG. 6 is a fragmentary cross sectional view illustrating the details of a coupling device in FIG. 5.

As shown in FIG. 6, the coupling device 25 has a slide shaft 40, and a bevel gear 39 is disposed integrally at the top end of the shaft 40 for engagement with the bevel gear 24. The slide shaft 40 is connected with the intermediate shaft 26 axially slidably by way of a spline 41. The axial center for each of the slide shaft 40 and the intermediate shaft 26 is aligned with the vertical axis O as shown in FIG. 5.

As shown in FIG. 6, a spring 42 is mounted around the slide shaft 40 and always biases the slide shaft 40 resiliently in the direction of engaging the bevel gear 39 to the bevel gear 24. Further, an electromagnet 43 is disposed to the outer circumference of the intermediate shaft 26 for magnetically attracting the slide shaft 40 against the resilience of the spring 42.

As shown in FIG. 5, a power source E is connected to the electromagnet 43 by way of a contact $S_M$, and the contact $S_M$ is closed upon energization of the relay $M_S$ (shown in FIG. 8) for controlling the coupling device 25 as detailed later.

Since the operation transmission systems 20 and 21 for the pedals 16 and the levers 17 are usually composed of electric or hydraulic signal lines, there is no problem when they are led out to the self-propelled vehicle being passed through a position near the vertical axis O.

Figure 7:
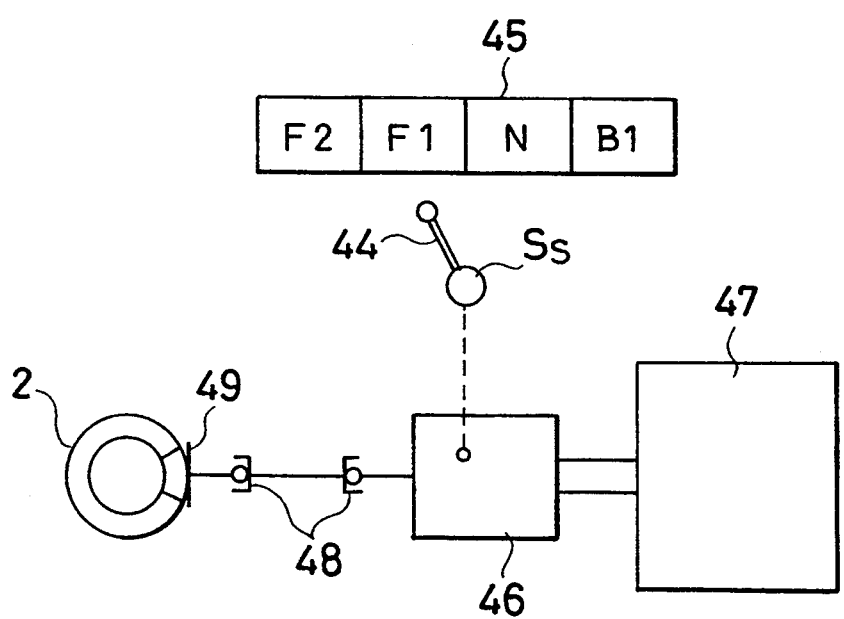
FIG. 7 is a schematic constitutional view illustrating a speed change gear.

FIG. 7 shows a speed change gear device of the self-propelled vehicle 1. In the drawing, reference numeral 44 denotes a shift lever that constitutes one of the levers 17 shown in FIGS. 3 and 4. When the shift lever 44 is shifted in accordance with the indication displayed on a speed change indication board 45 a shift lever switch $S_S$ to be detailed later is actuated. Then, a speed change gear 46 is controlled by the electric signal from the shift lever switch $S_S$.

The speed change gear 46 comprises a hydraulic speed change gear having a function capable of changing the vehicle speed stepwise. The mechanism and the operation of the speed change gear per se are well-known in the art of the transmission gears and any of suitable devices can be selected and available. For example, the speed change gear 46 has such a function as shifting the vehicle speed to two steps in the forward running direction and two steps in the backward running direction, in which the gear changing ratio at each of adjacent steps is equal between the forward and the backward directions.

The speed change gear 46 is so adapted to change the speed of the rotational force from a driving source 47 such as an engine and, subsequently, transmit it by way of universal couplings 48 and a differential mechanism 49 to the driving wheel 2.

Further, as detailed later, the speed change gear 46 in this embodiment is interlocked with the revolving of the driver's stand 6 and controlled so that the number of the shifting steps is restricted only to one step always during backward running, as viewed with respect to the driver 13.

Figure 8:
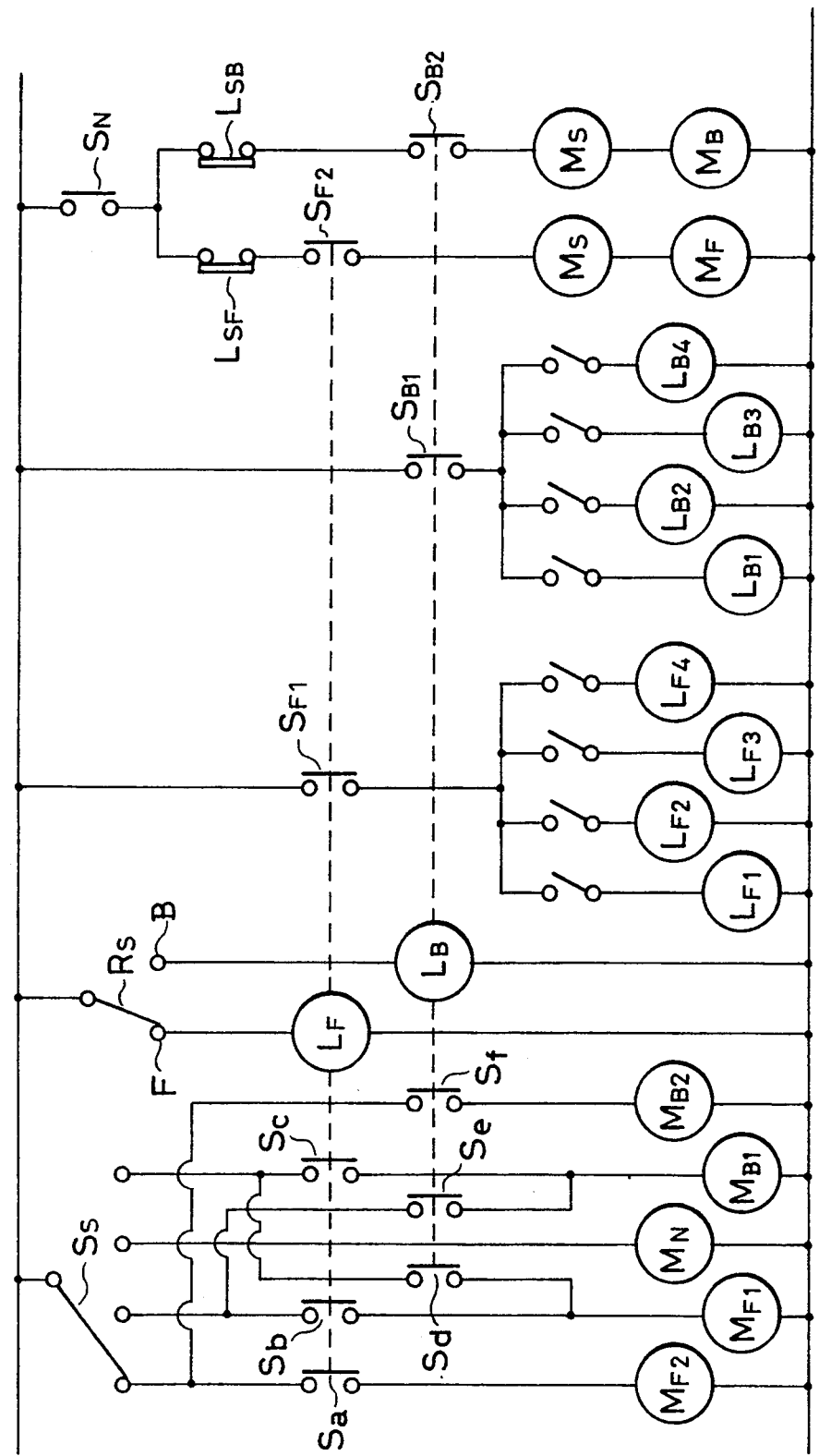
FIG. 8 is a circuit diagram illustrating a control circuit for controlling a self-propelled vehicle.

FIG. 8 shows a control circuit for a self-propelled vehicle 1.

In the drawing, there are shown a shift lever switch $S_S$, a speed change gear solenoid relay $M_{F2}$ for forward 2nd speed, a speed change gear solenoid relay $M_{F1}$ for forward 1st speed, a speed change gear solenoid valve relay $M_N$ for neutral, a speed change gear solenoid valve relay $M_{B1}$ for backward 1st speed, a speed change gear solenoid valve $M_{B2}$ for backward 2nd speed, a change-over switch $R_S$ for turning the direction of the driver's stand 6 a relay $L_F$ which is energized when the change-over switch $R_S$ is switched to the forward side F, contacts $S_a$, $S_b$, $S_c$, $S_{F1}$, $S_{F2}$ each of which is closed upon energization of the relay $L_F$, a relay $L_B$ which is energized when the change-over switch $R_S$ is switched to the backward side B and contacts $S_d$, $S_e$, $S_f$, $S_{B1}$, $S_{B2}$ each of which is closed upon energization of the relay $L_B$.

Further, there are also shown a head lamp $L_{F1}$ disposed to the front end of the self-propelled vehicle 1 and used in a state when the driver's stand 6 is directed forward as viewed in FIG. 1 (hereinafter simply referred to as the forwarded state), a head lamp $L_{B1}$ disposed to the rear end of the self-propelled vehicle 1 and used in a state when the driver's stand 6 is turned backward as viewed in FIG. 2 (hereinafter simply referred to as the backwarded state), a backward running lamp $L_{F2}$ disposed to the rear end of the self-propelled vehicle 1 and used in a state when the driver's stand 6 is directed forwardly, a backward running lamp $L_{B2}$ disposed to the front end of the self-propelled vehicle 1 and used in a state when the driver's stand 6 is directed backwardly, a brake lamp $L_{F3}$ used in the forwarded state, a brake lamp $L_{B3}$ used in the backwarded state, a tail lamp $L_{F4}$ used in the forwarded state and a tail lamp $L_{B4}$ used in the backwarded state.

Further, there are shown a contact $S_N$ which is closed upon energization of the speed change gear solenoid valve relay $M_N$ for neutral, a forward limit switch $L_{SF}$ for restricting the revolution of the driver's stand 6 in the forwarded state, a backward limit switch $L_{SB}$ for restricting the rotation of the driver's stand 6 in the backwarded state, a relay $M_S$ for controlling the coupling device 25, a relay $M_F$ for controlling the revolution of the driver's stand 6 in the forwarded state, and a relay $M_B$ for controlling the revolution of the driver's stand 6 in the backwarded state. The stand motor 9 shown in FIG. 3 is driven normally by the energization of the relay $M_F$ while the driver's stand motor 9 is driven reversely by the energization of the relay $M_B$.

OPERATION OF THE EMBODIMENT

Description will now be made to the operation of the preferred embodiment shown in the drawings.

In the forwarded state shown in FIG. 1, the turn-over switch $R_S$ shown in FIG. 8 is switched on the forward side F, so that the relay $L_F$ is energized, while the relay $L_B$ is deenergized. Accordingly, the contacts $S_a$, $S_b$, $S_c$, $S_{F1}$, $S_{F2}$ are closed, while the contacts $S_d$, $S_e$, $S_f$, $S_{B1}$, $S_{B2}$ are opened.

Now, since the contact $S_f$ is opened, the speed change gear solenoid valve relay $M_{B2}$ for backward 2nd speed is always deenergized irrespective of the switching position of the shift lever switch $S_S$. Accordingly, backward running speed of the vehicle 1 is limited only to the 1st speed.

Further, since the contact $S_{B1}$ is opened, electric current is not supplied to each of the lamps $L_{B1}$, $L_{B2}$, $L_{B3}$, $L_{B4}$ to be used for the backwarded state. The contact $S_{F2}$ is closed by the energization of the relay $L_F$, but the forward limit switch $L_{SF}$ is brought into contact with the actuation member 12 and turns open. Accordingly, even when the shift lever switch $S_S$ is switched to neutral thereby energizing the speed change gear solenoid valve relay $M_N$ for neutral and closing the contact $S_N$, the relay $M_F$ for controlling the driver's stand 6 is not energized to inhibit the revolution of the stand motor 9.

For turning the driver's stand 6 from forwarded state shown in FIG. 1 into the backwarded state shown in FIG. 2, the shift lever switch $S_S$ is at first switched to neutral thereby energizing the speed change gear solenoid valve relay $M_N$ for neutral, thereby closing the contact $S_N$.

Next, the turn-over switch $R_S$ is switched to the backward side B. Then, the relay $L_B$ is energized to close the contacts $S_d$, $S_e$, $S_f$, $S_{B1}$, $S_{B2}$ and, at the same time, the relay $L_F$ is deenergized to open the contacts $S_a$, $S_b$, $S_c$, $S_{F1}$, $S_{F2}$.

When the contact $S_{B2}$ is closed, the relay $M_S$ connected in series with the contact $S_{B2}$ for controlling the coupling device 25 is energized to close the contact $S_M$ shown in FIG. 5. Thus, electric current is supplied from the power source E to the electromagnet 43, by which the slide shaft 40 shown in FIG. 6 is magnetically coupled to the electromagnet 43 against the resilience of the spring 42 to release the engagement between both of the bevel gears 24 and 39. That is, the steering device 15 and the steering wheel 3 are separated as shown in FIG. 5.

Further, when the contact $S_{B2}$ is closed, the relay $M_B$ for controlling the rotation of the driver's stand 6 is energized as shown in FIG. 8, by which the stand motor 9 shown in FIG. 3 is rotationally driven reversely. Thus, the driver's stand 6 turns by 180° around the vertical axis O, by which the forwarded driver s seat 14 is now directed backward.

The motor 9 is driven reversely till the actuation member 12 shown in FIG. 3 is in brought into contact with the backward limit switch $L_{SB}$ to turn the latter open. The motor 9 is stopped when the backward limit switch $L_{SB}$ is opened. Further, since the relay $M_S$ is deenergized, the steering device 15 and the steering wheel 3 are connected.

By the way, since the contact $S_a$ is opened when the relay $L_F$ shown in FIG. 8 is deenergized, the speed change gear solenoid valve relay $M_F$ for forward 2nd speed is always deenergized irrespective of the switching position of the shift lever switch $S_S$. Since the forward 2nd speed in the former case (forwarded state shown in FIG. 1) now means the backward 2nd speed in this case (backwarded state shown in FIG. 2) as viewed with reference to the driver 13, the backward shifting with reference to the driver 13 is restricted only to one step, i.e., at the 1st speed.

Further, since the contact $S_{F1}$ is also opened by the deenergization of the relay $L_F$, electric current is not supplied to each of the lamps $L_{F1}$, $L_{F2}$, $L_{F3}$, $L_{F4}$ used for the forwarded state.

For turning the driver's stand 6 from the backwarded state (FIG. 2) to the forwarded state (FIG. 1), the shift lever switch $S_S$ is switched to neutral and, thereafter, the turn-over switch $R_S$ is switched to the forward side F. Then, the stand motor 9 shown in FIG. 3 is driven normally, by which the driver's stand 6 in the backwarded state shown in FIG. 1 returns to the forwarded state shown in FIG. 2.

As described above, since the direction of the driver's stand 6 can be rotated between the forwarded state and the backwarded state, complicate operation for the fork lift truck such as backward running or change of the running direction can be avoided substantially. In the state in which the driver's stand 6 is turned backward (FIG. 2), since the forward view of the driver 13 is not hindered by the cargoes 5 or the working mechanism 4, operation safety can be ensured. In addition, since the driver 13 is no more obliged to take an unnatural and constrained posture, it is no worry that the driver may be worn out or suffer from lumbago or like other disease.

In the above-mentioned embodiment, description has been made to a case that the driver's stand 6 takes only the two 180°-turned positions, that is, the forwarded state and the backwarded state. However, an intermediate position, i.e., a 90°-turned state may also be taken if required.

As has been described above, in accordance with the present invention, since the driver's stand can be turned rotationally around a vertical axis between the forwarded state and the backwarded state, troublesome backward looping operation required so far in the existent fork lift trucks for turning the running direction can be substituted with the operation for the forward running. Therefore, accidents caused by the fork lift truck in the prior art can be decreased remarkably. In addition, the driver can be free from lumbago or like other disease caused by long time and repeating operation in the unnatural and constrained posture, as well as the operation efficiency can be improved remarkably.

Further, in the present invention, various kinds of lamps are arranged as respective pairs and, in each pair of lamps, a lamp for the forwarded state is disposed to one end of the vehicle while the other lamp used for the backwarded state is disposed to the opposite end of the vehicle. The respective groups can be switched between each other and used selectively by the lamp controlling device, interlocking with the forward or backward revolution of the driver's stand. Accordingly, the lamps can be operated, in the same manner both in the case when the seat is turned forward and backward, so that operation safety can be ensured.

Further, since the speed change gear is controlled by a speed change gear controlling device the number of shifting steps on the backward running as viewed with reference to the driver is always restricted to one step. Accordingly, good running performance can be obtained also in the case, when the seat is turned backward in the same manner as in the case when the seat is directed forward, and there is no danger during backward running of the fork lift truck.

Further, the operation transmission system for the control device is led out to the side of the self-propelled vehicle through a position near the revolving center of the driver's stand, it is possible to simplify the structure of the driver's stand and, in particular, the structure of the operation transmission system.

Furthermore, since the coupling device is disposed in the operation transmission system of the control device for disconnecting the steering device and the steering wheel upon revolution of the driver's stand, the relation between the steering device and the steering wheel can always be kept constant regardless of the revolution of the driver's stand.

As many apparently widely different embodiments of this invention may be made without departing from the spirit and scope thereof, it is to be understood that the invention is not limited to the specific embodiments thereof except as defined in the appended claims.

What is claimed is:

1. A fork lift truck comprising:
   a self-propelled vehicle having a working mechanism disposed at a front end thereof;
   a driver's stand disposed to said self-propelled vehicle between the front end and a rear end of the vehicle opposite said front end;
   a driver'seat and a control device mounted respectively to said driver'stand;
   a mechanism for revolving said driver's stand around a vertical axis between a position in which the driver's seat is turned in a forward direction facing the front end and another position in which the driver's seat is turned in a backward direction facing the rear end of the vehicle,
   a speed change gear having:
   a plurality of speed shifting ratios for running in said forward direction,
   a plurality of speed shifting ratios for running in said backward direction,
   wherein said forward and backward running speed shifting ratios are equal in number, and
   a speed change gear controlling device for controlling said speed change gear, wherein said controlling device is responsive to the position of the driver's stand and controls the operation of the speed change gear such that when the driver's stand is turned in the forward direction facing the front end, the speed change gear is restricted to a first of said plurality of speed shifting ratios for running in said backward direction, and when the driver's stand is turned in the backward direction facing the rear end, the speed change gear is restricted to a first of said plurality of speed shifting ratios for running in said forward direction.

2. A fork lift truck as defined in claim 1, wherein an operation transmission system connected to the control device is passed from said driver's stand to said self-propelled vehicle through a position near the vertical axis.

3. A fork lift truck as defined in claim 1, wherein the control device comprises a steering wheel and the self-propelled vehicle comprises a steering device, and wherein an operation transmission system connecting the steering wheel to the steering device comprises a coupling device for disconnecting the steering wheel from the steering device during revolution of the driver's stand.

* * * * *